Nov. 3, 1936.  B. M. GREEN  2,059,944
AZIMUTH CIRCLE
Filed Feb. 28, 1935  4 Sheets-Sheet 1
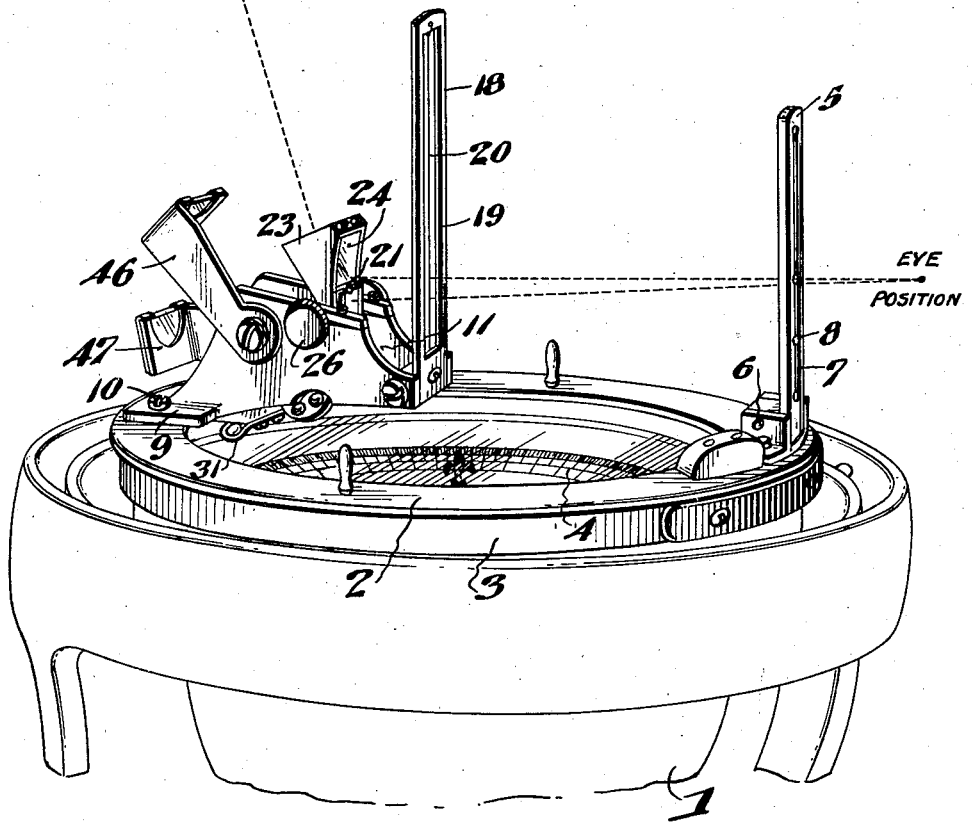
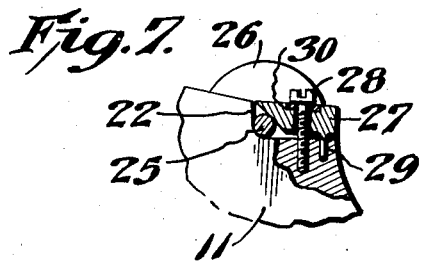
Inventor
Burton M. Green
By Lloyd W. Patch
Attorney Nov. 3, 1936.    B. M. GREEN    2,059,944
AZIMUTH CIRCLE
Filed Feb. 28, 1935    4 Sheets-Sheet 2

Inventor
Burton M. Green
By Lloyd W. Patch
Attorney

Nov. 3, 1936.  B. M. GREEN  2,059,944
AZIMUTH CIRCLE
Filed Feb. 28, 1935  4 Sheets-Sheet 3
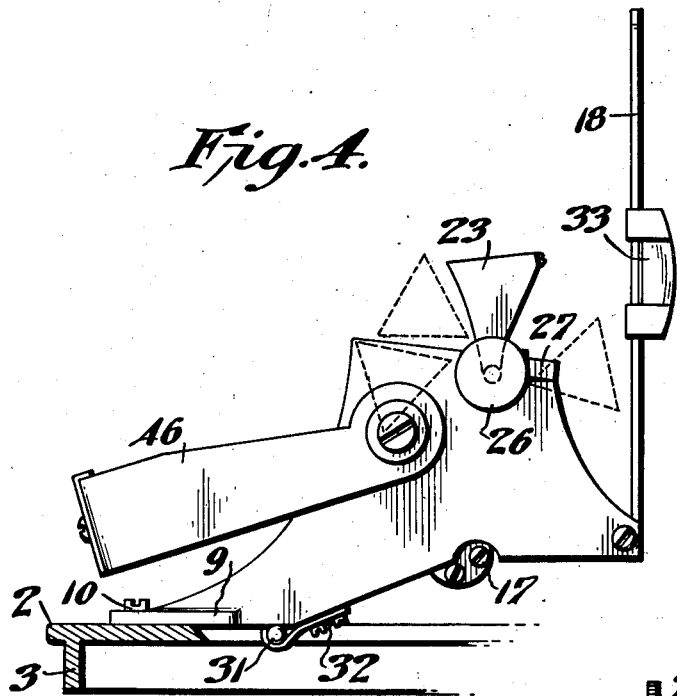
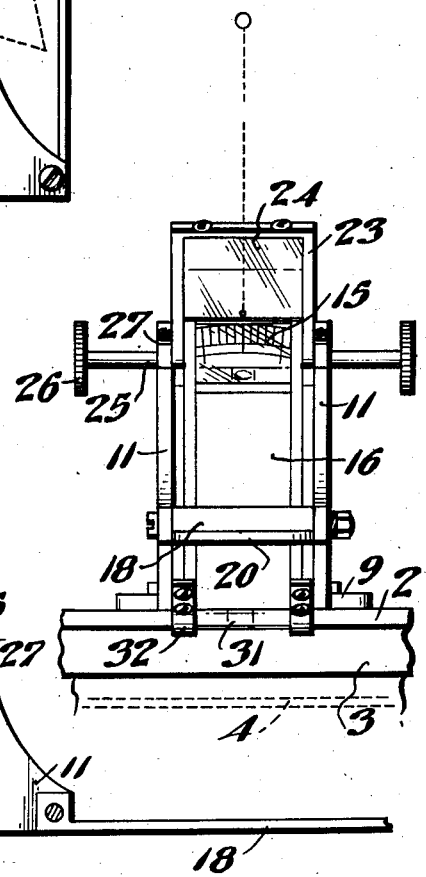
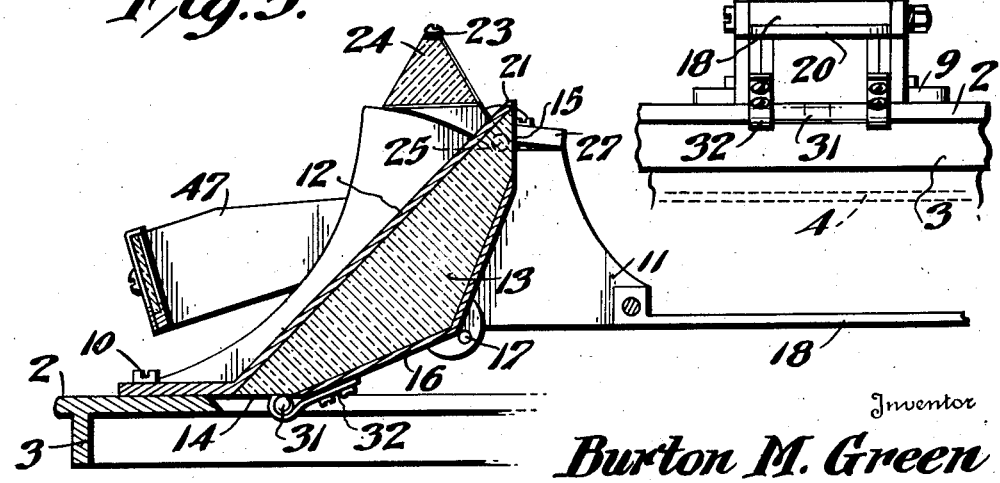
Inventor
Burton M. Green
By Lloyd W. Patch
Attorney Nov. 3, 1936.  B. M. GREEN  2,059,944
AZIMUTH CIRCLE
Filed Feb. 28, 1935  4 Sheets-Sheet 4

Inventor
Burton M. Green
By Lloyd W. Patch
Attorney

Patented Nov. 3, 1936

2,059,944

UNITED STATES PATENT OFFICE 2,059,944

AZIMUTH CIRCLE

Burton M. Green, Brooklyn, N. Y.

Application February 28, 1935, Serial No. 8,745

14 Claims. (Cl. 88—2.3)

My present invention relates to azimuth circles, and particularly to instruments of the type and character set forth in my Patent No. 2,028,063, January 14, 1936.

An object of this invention is to provide an azimuth or bearing circle to be associated with a mariner's, navigator's, surveyor's, or other compass, and to be used in taking bearings at sea as an aid to navigation, on land as for surveying, in the field to determine the position of an airship, aeroplane or other moving object, and in other connections where observations, bearings and readings are desired to be determined in connection with celestial and terrestrial bodies and objects, at all angles above the horizon up to the zenith, and at various angles below the horizon.

A further object is to provide an instrument of this character which includes leveling means interposed to be shown directly in the field of vision with compass card readings to thus permit most accurate adjustment of the instrument to follow and to maintain a level coinciding with the natural horizon, while at the same time following or retaining in view the body or object upon which the instrument is being trained.

A still further object resides in so constructing and arranging the parts that the compass card reading is shown by one reflecting means while the body or object can be caught in reflected image in another reflecting means, and in so mounting the second reflecting means that it can be adjusted to a position entirely out of the field of the first reflecting means to thus permit free and unobstructed direct sighting.

Another object is to provide a reflecting prism to show compass card and level readings and a second reflecting prism to show images of the body or object upon which the instrument is trained, and in so mounting the second prism that it can be adjusted to focus in and reflect the desired image, and in all positions of adjustment the second prism will be closely adjacent to and substantially overlapping in the field of vision with the apex of the first prism.

Still another object and purpose is to provide a compass reflecting prism that does not require the use of readily deteriorated silver or reflecting coatings, and which will reflect compass card readings and level indicating readings without inversion.

Yet another purpose is to provide an instrument which includes front and rear sights, in addition to the reflecting means, and which can thus be very accurately and closely focused upon the body or object.

With the above and other objects in view, which will be apparent to those skilled in the art, my present invention includes certain novel features of construction and combinations of parts, and improvements, which will be hereinafter set forth in connection with the drawings.

In the drawings:

Figure 1 is a view in perspective illustrating one adaptation of my present invention as it appears when applied to a compass for use.

Fig. 4 is an enlarged side elevation, with the ring or circle in section to better show the supporting and mounting structure.

Fig. 5 is an enlarged sectional view to better illustrate the disposition of the parts and to indicate some possible adjustments of the focusing prism.

Fig. 6 is a fragmentary illustration in elevation to show the view as it will appear through the sight when the structure is in use.

Fig. 7 is a broken sectional view to better illustrate one of the bearings for mounting of the image reflector.

Figure 2:
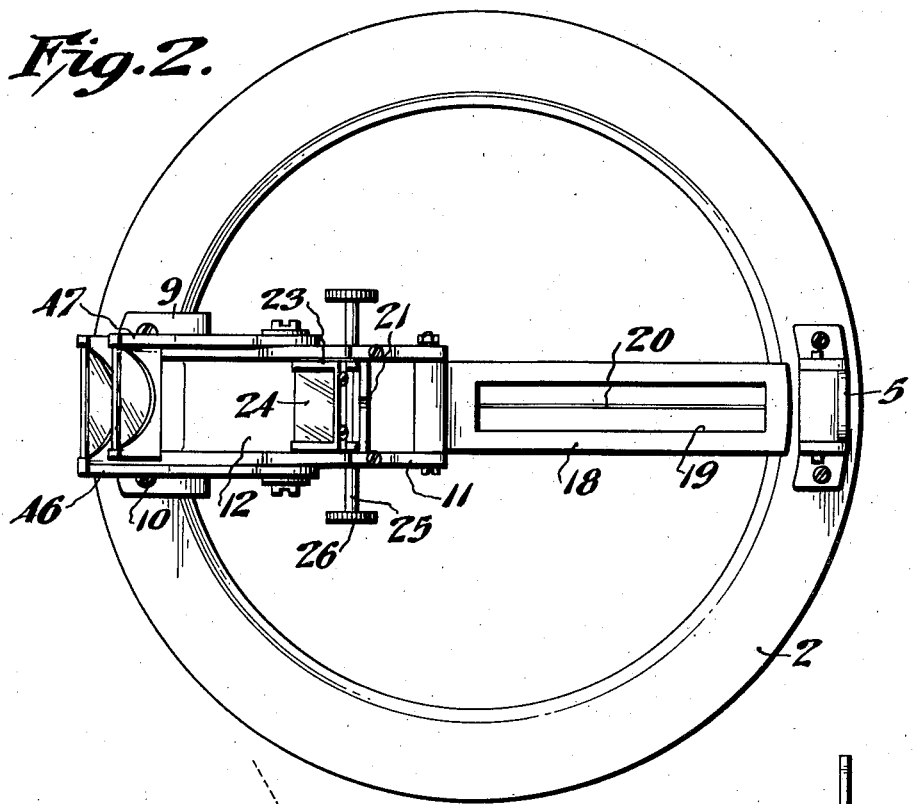
Fig. 2 is a top plan view of the circle and associated parts.
Figure 3:
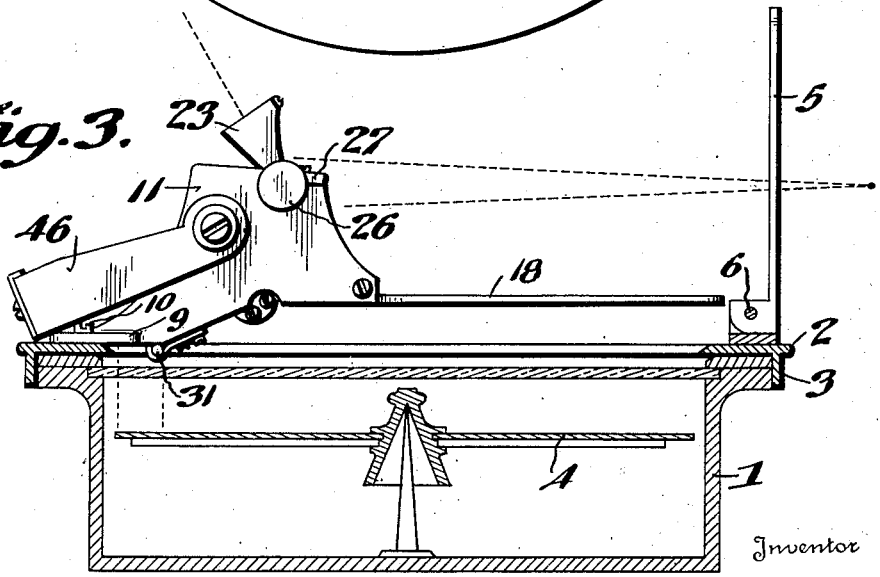
Fig. 3 is a transverse vertical view through the structure illustrated in Fig. 2, and showing the relative position upon a compass structure.
Figure 8:
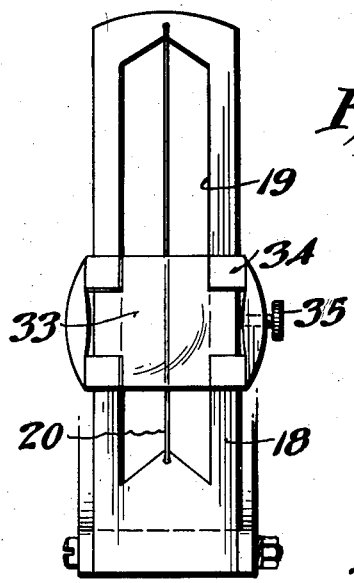
Fig. 8 is a fragmentary detail view to better show the front sight.
Figure 9:
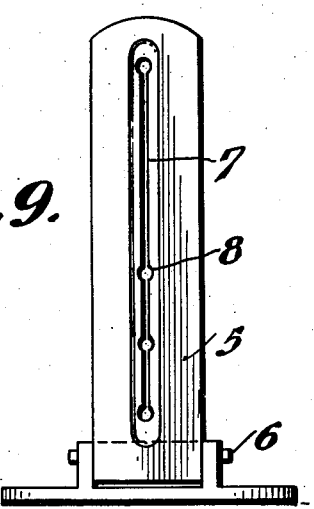
Fig. 9 is a fragmentary view of the rear sight.

The showing in Figure 1 illustrates my invention applied for use upon a gyroscopic compass, while the showing in Fig. 3 is in connection with an ordinary magnetic compass; and, it will be understood that the invention is adaptable for application to and use with substantially any and all types and constructions of compasses, surveying instruments and other instruments employing or including a compass or other directional indicating structure.

The compass structure, generally indicated at 1, and which as hereinbefore stated can be of any desired type or construction, has a ring 2 mounted thereon for revoluble movement in a normally horizontal plane, a flange 3 being provided to retain the ring in place, and the center of the ring being preferably fully open to give a free and unobstructed view of the compass card 4.

A rear sight 5 is hingedly mounted at 6, on one side of the ring, and is provided with an elongated sight slit 7 extending substantially at right angles to the plane of rotation of the ring 2. This sight slit may be provided at desired points with one or more peep openings 8, to thus designate particular elevations along the length of the sight slit 7.

A supporting frame work 9 is mounted on the ring 2, by means of screws 10 or other suitable fastenings, and is thus rigidly held at a point substantially diametrically opposite to the mounting of the sight 5. This supporting bracket structure 9 has side plates 11 extending in spaced relation inwardly therefrom, and a back plate 12 extends across between these side plates 11 and is disposed substantially at an angle of forty-five degrees from the horizontal. A compass card reflecting prism 13 is positioned between the side plates 11 and is protected by the back plate 12. This prism 13 is of pentagonal shape, and is of the double reflecting type. The face 14 of prism 13 is adjacent to and in a plane substantially parallel with the normal plane of the compass card 4, and the objective face 15 of the prism is disposed to show the reflected image in a substantially perpendicular plane, or in other words at an angle of substantially ninety degrees to the plane of the compass card. This prism 13 is made to be of the double reflecting type, and consequently will show image reflections of the compass card without inversion. Further, by reason of the form of the prism it is not necessary to silver or otherwise coat any of the faces of the prism 13 to accomplish full and clear reflection of the image in upright and proper relation. To protect the prism 13, and to maintain this prism in proper position, a mounting frame 16 is provided to fit upon the faces of the prism opposite the face covered by the back plate 12, and this mounting frame or shield plate structure is held in place by the use of screws 17, or other suitable fastenings.

The side plates 11 extend beyond the image face 15 of the prism 13, further toward the center of the circle or ring 2, and a front sight 18 is pivotally mounted between these extension portions. This front sight has an elongated and relatively wide sight opening 19 therethrough, and a hair sight line 20 is provided for fine and accurate viewing. It is desirable that this front sight 18 be pivotally mounted so that it can be swung down adjacent to the cover glass of the compass to thus be below the line of sight when observations are taken through the rear sight 5, without use of the front sight.

With this arrangement, the ring or circle 2 can be applied to a compass and can be turned and adjusted to permit the instrument to be lined or focused, through the front and rear sights 5 and 18, upon a celestial or terrestrial body or object, and the effective portion of the compass card will then be reflected in image in the objective face 15 of the prism 13, the hair line 20 of the front sight serving to bisect the image portion of the compass to permit an accurate and close reading of the compass indication. The front sight 18 can be made sufficiently long to permit focusing in upon objects or bodies above the horizon, and if desired, the back plate 12 can be provided with a notch or sight groove, at 21, so that the instrument can be sighted when the front sight 18 is folded down.

Adjacent to their upper edges the side plates 11 are provided with horizontally aligned bearings as generally indicated at 22, and preferably constructed after the manner illustrated in Fig. 7. A substantially U-shaped prism mounting frame 23 has a three sided prism 24, here shown as a substantially equilateral triangular prism, mounted and carried therein with its lower apex angle substantially parallel with the upper apex angle of the prism 13. This U-shaped frame is provided with trunnion pins 25 which are disposed with their axes of rotation on the lower side of the apex angle of prism 24, and these bearing trunnions 25 are journalled in the bearings 22 so that as hand wheels 26 on the ends of the trunnion shafts 25 are manipulated the U-shaped frame 23 and consequently the prism 24 will be swung and will be adjusted, for focusing and for other purposes, with respect to the prism 13. Due to the placement of the trunnion shafts 25, the entire prism structure 24 is bodily swung with respect to the upper apex angle of prism 13, and in consequence the lower angle of prism 24 is at all times maintained in close proximity to, or is slightly below a horizontal line taken through the upper apex angle of prism 13. In this way, there is at no time any appreciable separation or space between the adjustable external object prism 24 and the apex angle of the objective face 15 of the prism 13. With this construction, there is substantially no possibility or likelihood that any external object can be seen through a space between the two prisms, and it is possible to draw the external object or body reflection more clearly and closely into focus and into the proximated field of vision with the compass card reflection as viewed through the sights in the objective face 15 of the prism 13. The front and rear sights 18 and 5 function and serve to permit accurate focusing and centering of the reflection of the external body or image as caught and brought into the field of vision by the prism 24.

It is essential that the adjustable prism 24 shall at all times be maintained to swing upon a substantially horizontal axis, and that adjustments of the prism 24 when once made shall be retained until the parts are further manipulated and adjusted by the user. With this in mind, the bearings 22 are provided with bearing recesses to receive and center the trunnion or pintle shaft portions 25, and with blocks 27 to retain the portions 25 within the bearing recesses. These blocks 27 are secured in place by means of screws 28, or other suitable fastenings, and are retained in position by pins 29. Tension washers 30 are preferably provided to insure that uniform tension will be maintained upon the trunnion or pintle shafts 25 and that adjustments of the focusing prism 24 will be frictionally held and maintained.

As has been stated, it is essential that the image as focused into the prism 24 be brought closely into the field of vision with the reflection of the compass card, and it is also essential that level indicating readings be brought into this same field of vision so that in substance three observations and readings can be made simultaneously, namely a reading to show that the circle or ring 2 is disposed in substantially horizontal relation in a plane with the true horizon, a reading showing the reflected image of the body or object as focused in the prism 24, and a reading showing the effective portion of the compass card. It is essential that the ring or circle 2 must be absolutely level when the image of the object or body is seen centered in the prism 24 and when the reading of the compass card is taken, and with instruments as heretofore constructed, it has been extremely difficult to make accurate readings due to the fact that oftentimes the eye must be directed particularly to the level indicating means and then the line of vision must be varied to see the reflected image of the body or object as focused, and perhaps the line of sight must be shifted a third time to see the compass card reading. Obviously such shifting of the line of sight and such distraction from any one of the three essential indications will tend toward inaccuracy in the final bearing or other reckoning, and it is one of the primary purposes of my invention to provide an instrument in which the level indication is at all times shown substantially transposed upon the effective part of the compass card as reflected, and the image upon which the instrument is trained or focused will be also so closely adjacent to the compass card reading that there can be little likelihood for error or inaccuracies in the readings.

With the above in mind, I mount an open level 31, perhaps preferably of the tubular bubble oil type, in the field covered by the face 14 of prism 13. This level tube 31 can be held in place by means of clips 32, or in any other suitable manner, and the level indication will thus be reflected through the prism 13 to be shown transposed upon the reflected portion of the compass card, and the level indication can be at all times kept fully in view without shifting the line of vision or distracting from a full view of the focusing prism 24.

Where the prism 24 is being adjusted to focus in a celestial body of the second or lesser magnitude, or to give an image of any obscure or small terrestrial indication or mark, the vision, and consequently the use and efficiency of the instrument, may be improved by providing a suitable magnifying glass or lens 33 on the front sight 18. This aid to vision can be of any desired type, and can be carried by frame portion 34 to be adjustable vertically upon the front sight 18, a set screw 35, or other means, being suitably provided to hold adjustments thereof.

Figure 10:
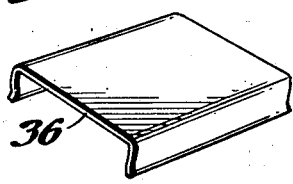
Fig. 10 is a perspective view showing a covering shield for the reflector.

As has been stated, in some uses the prism 24 will be swung out of the line of sight, and in this relation the prism will be substantially folded down against the back plate 12. If desired, a shield or spring clip cover 36, as shown in Fig. 10 can be provided to be fitted over the upper edges of the side plates 11, and the prism 24 is then protected from accumulation of moisture, dirt, or other foreign substances.

Figure 11:
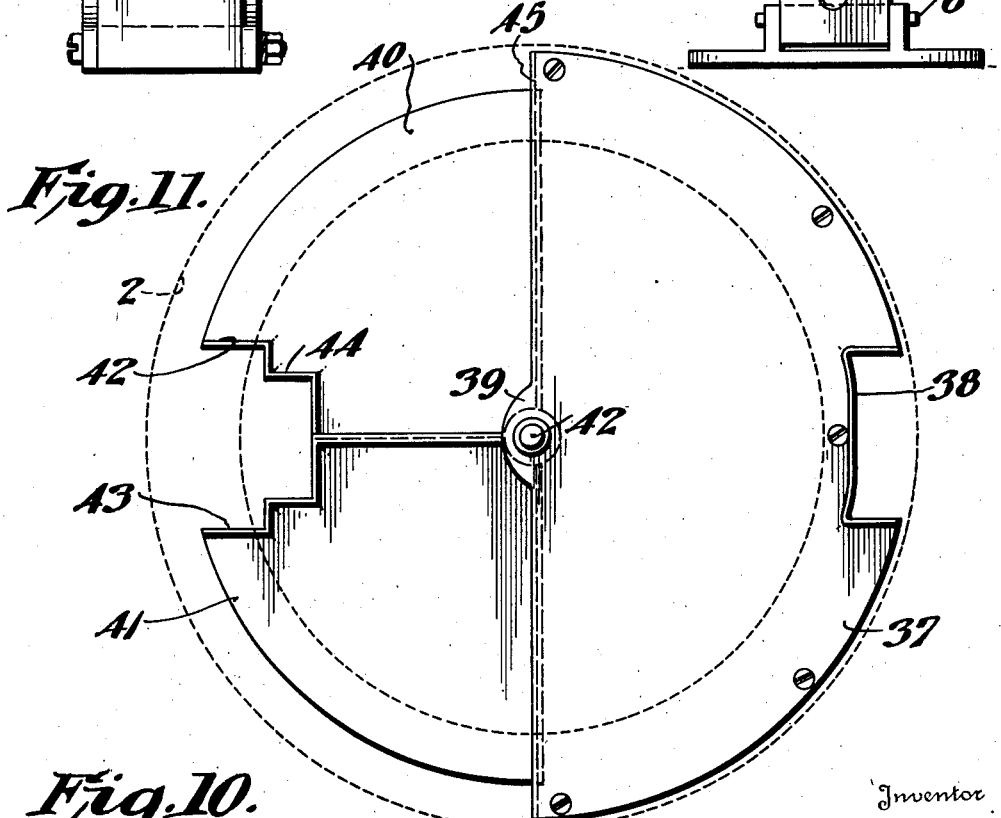
Fig. 11 is a plan view illustrating a form of cover adaptable for use with my instrument.

At night, where an illuminated compass is used, the effective portion of the compass card will be very clearly caught and reflected by the prism 13, and as the level indicating means 31 is of the open tube type, the light will readily penetrate to show this leveling means fully and clearly in the image visible at the objective face 15 of the prism. However, the light of the compass may interfere with effective and efficient focusing upon celestial bodies of lesser magnitude, upon dim shore lights, and upon other bodies or objects from which bearings are desired to be taken. With this in mind, I provide a cover structure, one form of which is illustrated in Fig. 11. As here shown, the cover closes over the major portion of the top of the compass, and the substantially semi-circular body portion 37 is shaped and constructed to be fitted upon the ring 2, and is provided with suitable notches or recesses 38 to accommodate the front sight 5. This body portion 37 has at its center a bearing 39, and the segment-shaped shield members 40 and 41 are pivotally and swingably mounted on this bearing portion 39, by means of pin 42 or other suitable pivotal means. These segment-shaped shield plates 40 and 41 are notched or recessed at 42 and 43 to accommodate the supporting portion 9 and these notched or recessed formations are preferably so shaped that the edges of the segment-shaped shield portions 40 and 41 will fit closely adjacent to the prism supporting structure. It may be found desirable to provide upturned rim flanges 44 around the recesses 42 and 43 and to provide interfitting flange portions 45 at adjacent edges of the two shield members 40 and 41 where they meet, and at the edge of the body portion 37, where this terminates adjacent to the shield members. The body portion 37 can be provided with clip portions to be sprung over the ring 2, or screws or other suitable fastenings can be employed to mount the body portion in place. With this shield and cover structure it is possible to open either of the shield members 40 or 41, or both, so that the compass card can be viewed, or all portions can be closed and light will then be held in and rain, dust, spray, and the like will be excluded, the flange formations at 44 and 45 serving effectively to turn back water which might otherwise drive or seep through between the several members and parts.

This cover will be found most useful on dark nights when watching the bearing of lights especially on approaching vessels in close quarters, as it blanks out the illuminated face of the compass and allows only the compass field in the effective area to become visible in the lower prism; and, at the same time this elimination of the light from the face of the compass and the consequent prevention of effusion of light from the top of the compass very materially aids the eye when bringing celestial bodies down to the plane of sight in the object prism. With this cover the effusion of light from the top of the compass is excluded without diminishing the illumination of the effective portion of the compass field under the prism, and at the same time the waterproof features of the cover shield the compass glass from exposure to damage.

The usual shade glasses 46 and 47 can be mounted in the manner shown, or in any other desired manner, to be available to be shifted and adjusted into and out of positions for use. Also, as an aid in excluding external light and the like various well known shade of shield structures can be fitted in connection with either or both of the sights. It is usual and customary to provide counterbalance weights and frictional brake or drag means upon the ring 2 so that the balance of the compass upon its gimbals or other supports will not be disturbed, and that adjustments of the ring when revolved upon the compass structure will be maintained, and I have therefore not here particularly described such structure. Also, handle portions can be provided upon the ring to permit more ready turning movement thereof.

In some instances it may be found advisable to omit the ring 2, and to provide in lieu thereof legs or supporting feet adapted to rest upon the glass or the rim of the compass case, and to be positioned and guided in their rotational movement by the rim, or by other suitable portions of the compass case or structure. Further, the prismatic structure can be made and be supplied for application to or mounting upon a ring, or other suitable support, as now already in use.

I have here particularly illustrated the rear sight as being of peep sight construction, and have particularly shown the front sight as a hair sight, but varying conditions may necessitate changes in the type of sight employed in each instance. In some instances it will be found desirable to use the instrument without the front sight 18, and focusing can then be accomplished through the grooved sight 21 in the upper edge of the back plate 12, and the focusing will thus be substantially at the upper apex edge of the obejective face 16 of the compass deflecting prism 13. For more convenient use in this manner it is desirable that the front sight 18 be made of such length that it will fold down between its pivotal mounting and the mounting of the rear sight 5, and then this forward sight 18 is entirely below the field of vision and will not in any way interfere with or obstruct the use of the rear sight and other portions. In some instances it may be found necessary or desirable to cut or otherwise mark a sight line upon one or both of the prisms 13 and 24, to serve substantially the same purpose as is accomplished by the hair strand or wire 20 of the front sight 18.

While I have illustrated only certain specific embodiments of my present invention, and have referred to only certain possible other adaptations and constructions, it will be appreciated that many changes and variations can be made in the form, construction, arrangement, assembly, mounting, association, use, adjustment and operation of the parts, without departing from the spirit and scope of my invention.

I claim:

1. With a ring to be associated with a compass and revoluble in a substantially horizontal plane, a sight carried by said ring for viewing radially with respect to the compass, level indicating means carried by the ring opposite said sight, and a pentagonal-shaped prism disposed to be viewed through the sight and constructed to show juxtapositioned reflections of the leveling means and the compass card in the same field of vision and in a line diametrically across the ring from the sight.

2. With a ring to be associated with a compass and revoluble in a substantially horizontal plane, a sight carried by said ring for viewing radially with respect to the compass, level indicating means carried by the ring opposite said sight, a pentagonal-shaped prism disposed to be viewed through the sight and constructed to show juxtapositioned reflections of the leveling means and the compass card in the same field of vision and in a line diametrically across the ring from the sight, and a reflecting prism adjustably mounted to swing on a substantially horizontal axis immediately adjacent to the first mentioned prismatic means to catch and reflect showing of an external image also closely adjacent to and within the line of sight with the reflections of the compass and level reading.

3. With a compass, a ring revolubly associated with the compass, a sight carried by said ring at one side, leveling means carried by the ring diametrically opposite the sight, a single five-sided double reflection prism carried by the ring in line with the sight to reflect in correct reading relation an image of a portion of the compass card immediately in the diametrical line of sight and at the same time to show an interposed image of the leveling means in the same field of vision.

4. With a ring to be associated with a compass and revoluble in a substantially horizontal plane, a sight carried by said ring for viewing substantially horizontally and radially with respect to the compass, level indicating means carried by the ring opposite said sight, a pentagonal-shaped prism disposed to be viewed through the sight and constructed to show juxtapositioned reflections of the leveling means and the compass card in the same field of vision and in a line diametrically across the ring from the sight, and a second sight means disposed intermediate the first sight means and the reflecting parts to thus permit more accurate centering upon the image.

5. With a compass, a ring revolubly associated with the compass, a sight carried by said ring at one side, leveling means carried by the ring diametrically opposite the sight, a single five-sided prism carried by the ring in line with the sight to reflect an image of a portion of the compass card immediately in the diametrical line of sight and at the same time to show an interposed image of the leveling means in the same field of vision, and a substantially triangular prism swingably mounted upon a horizontal axis eccentrically centered with respect to the apex angle of the viewing plane of the first mentioned prism to thus be capable of swinging focusing movement with its lower angular edge closely adjacent to the first mentioned prism means and to positions receding back of and below the apex edge of the first mentioned prism.

6. With a ring to be associated with a compass and revoluble in a substantially horizontal plane, a sight carried by said ring for viewing radially with respect to the compass, level indicating means carried by the ring opposite said sight, a single pentagonal-shaped double reflecting prism disposed to be viewed through the sight and constructed to show juxtapositioned reflections of the leveling means and the compass card in the same field of vision and in a line diametrically across the ring from the sight, a reflecting prism adjustably mounted to swing on a substantially horizontal axis immediately adjacent to the first mentioned prismatic means to catch and reflect showing of an external image also closely adjacent to and within the line of sight with the reflections of the compass and level reading, and resilient tension means to maintain proper centering and retain adjustments of the swingable adjustable prism.

7. With a compass, a single pentagonal reflecting prism having an objective face readable diametrically across the compass card to show an indicating portion of the compass card, and level indicating means interposed to be shown upon the image of the compass card reflected in the objective face of the prism.

8. The combination, with a compass and an azimuth circle, of a single prism to show readings of a compass card without reversal, a second prism swingably and substantially eccentrically mounted adjacent to the apex angle of the objective face of the first compass for adjustable movement to catch and reflect an image upon which a focus is to be taken, the second prism due to its eccentric mounting being at all times positioned to allow the focused image to be drawn down closely adjacent to the apex angle of the compass reflecting prism, and level indicating means positioned in the field of the first prism to be shown interposed over the showing of the compass card.

9. With a compass, a three-sided prism to reflect external image, a five-sided prism closely adjacent to the first prism to reflect in the same field of vision and without reversal a compass reading, and level indicating means positioned to be reflected in the second prism and shown in interposed relation upon the compass field.

10. With a compass, a prism to reflect external image, a second prism closely adjacent to the first prism to reflect in the same field of vision a compass reading, a front sight directed toward said prisms, and a single rear sight interposed between the prisms and the front sight to establish a line for focusing and viewing reflection in both of said prisms.

11. With a compass, a ring fitted around the face of the compass, and cover structure carried by said ring provided with substantially segmental swingably mounted members to be moved back to expose the face of the compass therebeneath.

12. An apparatus for taking bearings comprising, a compass, a ring revolubly associated with said compass, a sight carried at one side of said ring, a reflector associated with said ring at a point substantially diametrically opposite to said sight to reflect readings of the compass, level means interposed over the face of the compass to transpose a reflection of said leveling means adjacent to the reflected readings of the compass, and a second reflector associated with said ring at a fixed location immediately adjacent to and within the field of vision with said first reflector as viewed through the sight and adjustably held to permit focusing of an image adjacent to the reflected compass reading.

13. An apparatus for taking bearings comprising, a compass, a ring revolubly associated with said compass, a sight carried at one side of said ring, a reflector associated with said ring at a point substantially diametrically opposite to said sight to reflect readings of the compass, level means interposed over the face of the compass to transpose a reflection of said leveling means adjacent to the reflected readings of the compass, a second reflector associated with said ring at a fixed location immediately adjacent to and within the field of vision with said first reflector as viewed through the sight and adjustably held to permit focusing of an image adjacent to the reflected compass reading, and a second sight interposed in front of the sight as carried at one side of the ring to serve as a center for focusing and reading of the reflections in both of the reflectors.

14. With a compass, a supporting ring fitted around the compass, a cover portion carried by the ring to cover non-effective portions of the face of the compass, and segmental-shaped cover portions swingably mounted on said first mentioned cover portion to be swung to closed positions to cover the effective portion of the face of the compass and to opened positions to permit viewing of this portion of the face of the compass.

BURTON M. GREEN.